United States Patent
Sasaki

(10) Patent No.: US 9,200,610 B2
(45) Date of Patent: Dec. 1, 2015

(54) CONTROL DEVICE FOR INTERNAL COMBUSTION ENGINE

(71) Applicant: NISSAN MOTOR CO., LTD., Yokohama-shi, Kanagawa (JP)

(72) Inventor: Yuji Sasaki, Hadano (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/414,196

(22) PCT Filed: Jul. 17, 2013

(86) PCT No.: PCT/JP2013/069389
§ 371 (c)(1),
(2) Date: Jan. 12, 2015

(87) PCT Pub. No.: WO2014/014018
PCT Pub. Date: Jan. 23, 2014

(65) Prior Publication Data
US 2015/0211471 A1 Jul. 30, 2015

(30) Foreign Application Priority Data
Jul. 18, 2012 (JP) ................. 2012-159208

(51) Int. Cl.
*F02D 45/00* (2006.01)
*F02P 5/04* (2006.01)
(Continued)

(52) U.S. Cl.
CPC ................ *F02P 5/045* (2013.01); *F02D 13/02* (2013.01); *F02D 13/0203* (2013.01);
(Continued)

(58) Field of Classification Search
CPC . F02D 13/02; F02D 13/0207; F02D 13/0219; F02D 13/0261; F02D 41/22; F02D 43/00; F02D 45/00; F02D 2041/001; F02P 5/15; Y02T 10/18

USPC ................ 123/90.11, 90.15, 406.11, 406.12, 123/406.18, 406.23, 406.29, 406.32, 123/406.47; 701/105, 110, 111
See application file for complete search history.

(56) References Cited

U.S. PATENT DOCUMENTS

| | | | |
|---|---|---|---|
| 4,960,094 A | 10/1990 | Koike et al. | |
| 6,024,062 A * | 2/2000 | Kako et al. | ................. 123/90.17 |
| 6,295,970 B1 * | 10/2001 | Kawakami | .................... 123/486 |
| 6,325,047 B2 * | 12/2001 | Kawakami | ............... 123/406.64 |

(Continued)

FOREIGN PATENT DOCUMENTS

| | | |
|---|---|---|
| EP | 1 128 047 A2 | 8/2001 |
| JP | H02-102347 A | 4/1990 |

(Continued)

OTHER PUBLICATIONS

Extended European Search Report dated Jun. 1, 2015 in corresponding European Patent Application No. 13819619.

*Primary Examiner* — John Kwon
*Assistant Examiner* — Johnny H Hoang
(74) *Attorney, Agent, or Firm* — Drinker Biddle & Reath LLP

(57) ABSTRACT

There is provided a valve timing varying mechanism (VTC) to vary a valve timing. An estimated VTC conversion angle VTCNFS is calculated in accordance with a sensed VTC conversion angle VTCNOW (S15~S19). At the time of conversion of the VTC conversion angle to the advance side or retard side, a fastest response value is calculated by conversion of the VTC conversion angle from the previous sensed value with a fastest response speed, and the sensed value (estimated value) is limited to or below the fastest response value when the current value of the sensed valve timing exceeds the fastest response value (S20, S21).

4 Claims, 7 Drawing Sheets

1 --- INTERNAL COMBUSTION ENGINE
2 --- THROTTLE VALVE
3 --- INTAKE VALVE
4 --- EXHAUST VALVE
6 --- INTAKE VALVE TIMING VARYING MECHANISM
10 --- CONTROL UNIT
16 --- KNOCK SENSOR

(51) Int. Cl.
   *F02P 5/15* (2006.01)
   *F02D 13/02* (2006.01)
   *F02D 37/02* (2006.01)
   *F02D 41/00* (2006.01)
   *F02D 41/22* (2006.01)

(52) U.S. Cl.
   CPC ............ *F02D 13/0234* (2013.01); *F02D 37/02* (2013.01); *F02D 41/0002* (2013.01); *F02D 41/222* (2013.01); *F02P 5/15* (2013.01); *F02D 2041/001* (2013.01); *Y02T 10/42* (2013.01); *Y02T 10/46* (2013.01)

(56) References Cited

U.S. PATENT DOCUMENTS

| 7,403,849 B1* | 7/2008 | Watanabe et al. | 701/102 |
| 2003/0121500 A1* | 7/2003 | Shimizu | 123/406.45 |
| 2005/0211207 A1* | 9/2005 | Urushihata et al. | 123/90.17 |
| 2006/0081217 A1* | 4/2006 | Fuwa et al. | 123/350 |

FOREIGN PATENT DOCUMENTS

| JP | 2005-016413 A | 1/2005 |
| JP | 2007-032380 A | 2/2007 |
| JP | 2008-045467 A | 2/2008 |
| WO | WO 2004/092549 A1 | 10/2004 |

\* cited by examiner

1 ⋯ INTERNAL COMBUSTION ENGINE
2 ⋯ THROTTLE VALVE
3 ⋯ INTAKE VALVE
4 ⋯ EXHAUST VALVE
6 ⋯ INTAKE VALVE TIMING VARYING MECHANISM
10 ⋯ CONTROL UNIT
16 ⋯ KNOCK SENSOR

BASE TRACE KNOCK IGNITION TIMING MAP

TRACE KNOCK IGNITION TIMING CORRECTION RATE MAP

TARGET VTC CONVERSION ANGLE MAP

VTC FASTEST RESPONSE SPEED

VTC SLOWEST RESPONSE SPEED

CONTROL DEVICE FOR INTERNAL COMBUSTION ENGINE

TECHNICAL FIELD

The present invention relates to control of an internal combustion engine equipped with a valve timing varying mechanism capable of varying a valve timing of an engine valve, and to calculation of sensed values of the valve timing taken into consideration for setting of another actuator of the internal combustion engine (for setting of the ignition timing, for example).

BACKGROUND ART

As mentioned in a Patent Document 1, for restraining knocking in an internal combustion engine, a so-called trace knock control is performed to retard the ignition timing when a knocking at a predetermined level is detected. In the case of the internal combustion engine equipped with a valve timing varying mechanism capable of varying a valve timing of an engine valve (intake vale and exhaust valve) of the engine, a control system is arranged to sense an actual valve timing with a sensor such as a cam angle sensor, and to set the ignition timing (variation and speed of the ignition timing) in accordance with the sensed valve timing.

PRIOR ART LITERATURE

Patent Document(s)

Patent Document 1: JP H02-102347 A

SUMMARY OF THE INVENTION

Problem to be Solved by the Invention

In the case of judging sensing abnormality of the valve timing, during a time period until an abnormality (NG) is confirmed, the sensed valve timing might be inaccurate. If the sensed valve timing is deviated from the actual valve timing for some reason, the setting based on the inaccurate sensed valve timing might lower the accuracy in setting the ignition timing, and might cause knocking with excessively advanced ignition timing, for example.

Means for Solution of the Problem

The present invention has been devised in view of such situation. According to the present invention, there is provided a valve timing varying mechanism capable of varying a valve timing of an engine valve of an internal combustion engine, a sensed valve timing or sensed value of a valve timing is detected, and another actuator of the internal combustion engine is controlled on the basis of the sensed valve timing or the sensed value. At the time of conversion of the valve timing to the advance side or the retard side, a control system calculates a value of a predetermined response valve timing obtained by conversion of the valve timing with respect to a previous value of the sensed valve timing with a predetermined response speed, and limits the sensed valve timing so that the sensed valve timing becomes lower than or equal to the predetermined response valve timing when the sensed valve timing exceeds the predetermined response valve timing.

The thus-determined sensed valve timing is used, for example, for setting the ignition timing in a trace knock control.

Effects of the Invention

According to the present invention, the control system limits the sensed value of the valve timing to or below a predetermined response value obtained by converting the valve timing with a predetermined response speed, and thereby restrains deviation of the sensed value from the actual valve timing even if the sensed valve timing is deviated from the actual valve timing for some reason. Consequently, the control system can improve the accuracy in setting the ignition timing in accordance with the sensed valve timing and prevent knocking due to excessive advancement of the ignition timing.

MODE(S) FOR CARRYING OUT THE INVENTION

Figure 1:
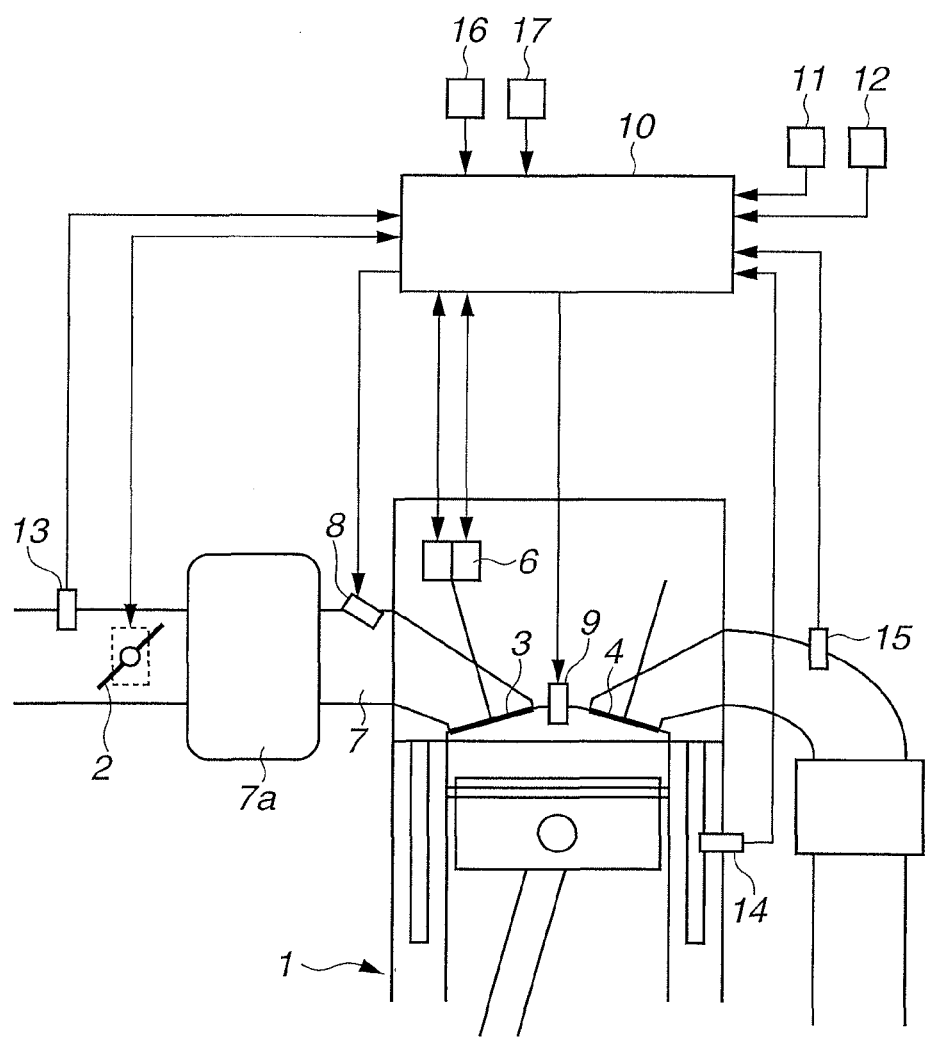
FIG. 1 is a view showing a system construction of a control apparatus for an internal combustion engine, according to one practical example of the present invention.

Following is explanation on preferred embodiment(s) according to the present invention, with reference to the drawings. FIG. 1 shows a system construction of engine control apparatus according to one practical example of the present invention, for an internal combustion engine. An internal combustion engine 1 includes, as engine valve, intake valve 3 and exhaust valve 4. Moreover, internal combustion engine 1 is provided with an intake valve timing varying mechanism 6 (hereinafter also referred to as "VTC") as a variable valve actuating mechanism capable of varying the valve timing of intake valve 3. In this practical example, the intake valve timing varying mechanism 6 is arranged to continuously retard and advance the intake valve opening timing and the intake valve closing timing simultaneously by equal amounts without varying an operation angle (opening and closing periods) by retarding and advancing the center angle of the operation angle of intake valve 3 continuously with respect to the crank angle. The intake valve timing varying mechanism 6 is a vane type mechanism to retard and advance the rotational phase of a drive shaft with respect to the crank angle by varying the relative rotational position between a rotor rotating with the drive shaft (cam shaft) for driving the intake valve and a housing rotated by the crank shaft, as explained in JP2007-32380A. Since the construction of the intake valve timing varying mechanism 6 is known, detailed explanation is omitted.

A throttle valve 2 of an electronic control type is provided on the upstream side of a collector 7a of an intake passage 7, and arranged to control the opening with an actuator such as a motor. The throttle valve 2 is used mainly to produce a slight negative pressure (−50 mmHg, for example) required for treating the blow-by gas in the intake passage 7, and the adjustment of the intake air quantity is performed basically by varying the valve lift characteristic of intake valve 3 with the intake valve timing varying mechanism 6. Moreover, a fuel injector 8 is disposed in intake passage 7, and arranged to inject fuel in a quantity corresponding to the intake air quantity adjusted by intake valve 3 or throttle valve 2.

A control unit 10 receives a cam angle signal representing the rotation angle of the camshaft on the intake valve's side sensed by a cam angle sensor 11, a signal of a crank angle which is the rotation angle of the crankshaft sensed by a crank angle sensor 12, an intake air quantity signal from an intake air quantity sensor 13, a water temperature signal from a cooling water temperature sensor 14, an exhaust gas's air-fuel ratio signal sensed by an air fuel ratio sensor 15, etc. In addition to these signals, the control unit 10 further receives a knock signal from a knock sensor 16 for sensing knocking in the combustion chamber, and an oil temperature signal from an oil temperature sensor 17. From these input signals, the control unit 10 calculates the fuel injection quantity, the fuel injection timing, the ignition timing, and target opening of throttle valve 2, etc. In addition to these quantities, the control unit 10 further calculates a target value TARGET of a VTC conversion angle corresponding to the valve timing of the intake valve timing varying mechanism 6 as mentioned later. Then, control unit 10 controls the fuel injector 8 and an ignition plug or spark plug 9 to achieve the required fuel injection quantity and ignition timing. Moreover, control unit 10 outputs, to an actuator of the intake valve timing varying mechanism 6, a control signal to achieve the target value TARGET of the VTC conversion angle of intake valve timing varying mechanism 6, and controls the opening of throttle valve 2 to achieve the above-mentioned target opening.

Figure 2:
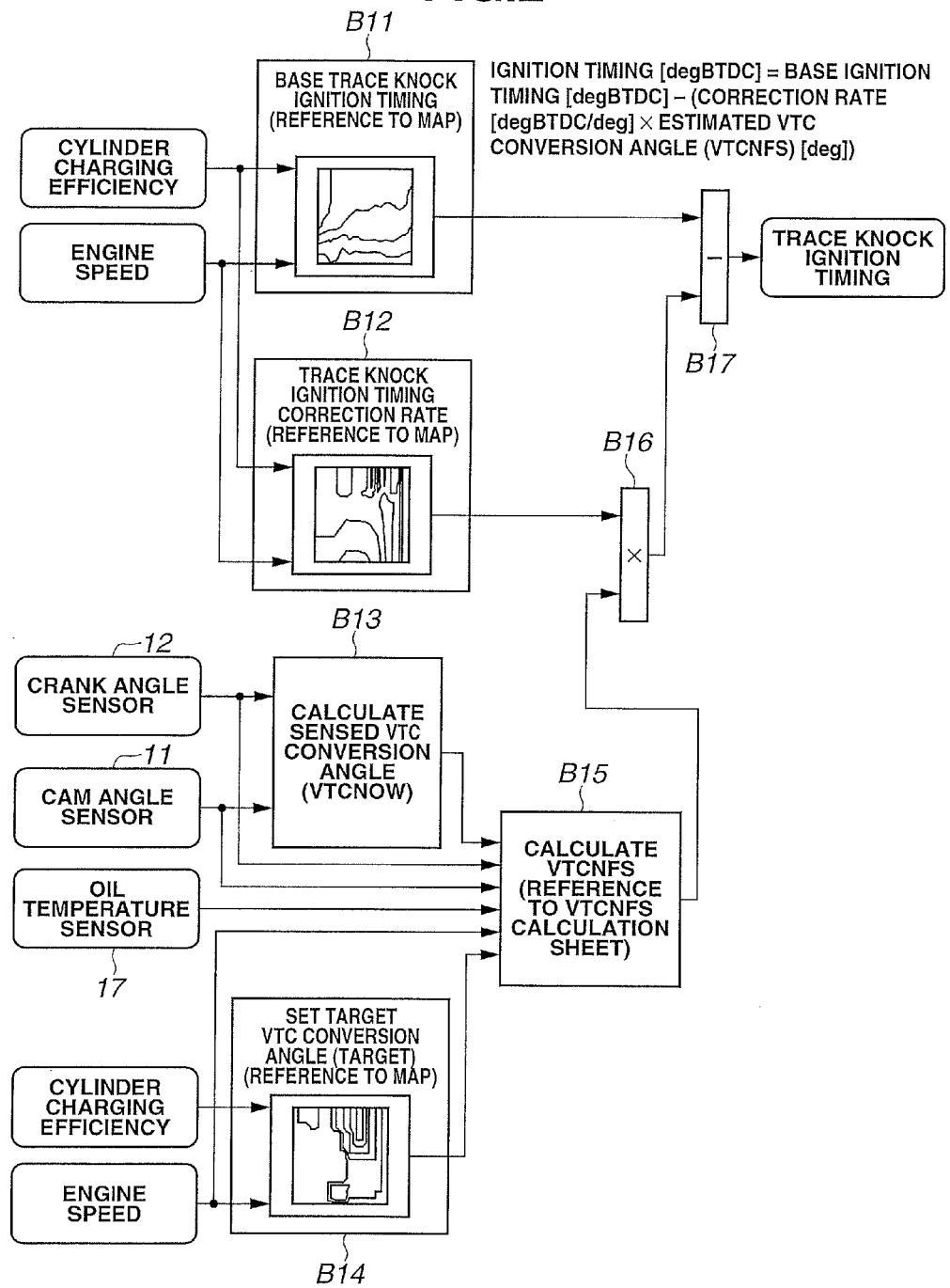
FIG. 2 is a function block diagram showing a process of setting an ignition timing for a trace knock control according to the practical example.

In this practical example, the control system or apparatus performs a so-called trace knock control for controlling the ignition timing to the advance side as much as possible within a range in which the knocking strength and frequency are lower than or equal to predetermined levels, in accordance with the signal from knock sensor 16. FIG. 2 is a function block diagram showing operations of setting the ignition timing in the trace knock control.

Figure 3:
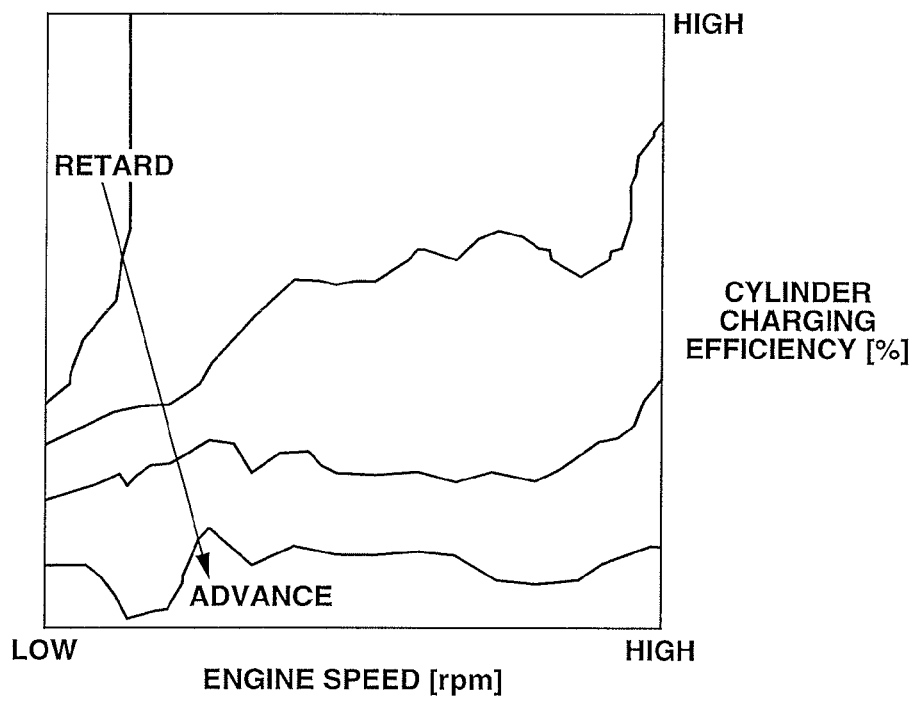
FIG. 3 is a characteristic view showing a map for setting a base ignition timing for the trace knock control of FIG. 2.

A block B11 is a section to determine a base ignition timing or basic value of the ignition timing for the trace knock control (trace knock ignition timing), from a cylinder charging efficiency and an engine speed, by referring to a map of the base trace knock ignition timing or basic value of the trace knock ignition timing as shown in FIG. 3, preliminarily set and stored through experiment using an actual machine. The cylinder charging efficiency is determined from the intake air quantity, the valve timing(s), etc. The engine speed is determined from the sensor signal from crank angle sensor 12 etc. As shown in FIG. 3, the base ignition timing or basic value of the ignition timing is set on the retard side as the cylinder charging efficiency becomes higher since the possibility of knocking becomes higher. Instead of the cylinder charging efficiency, it is possible to use the intake air quantity, a required torque or an engine load.

Figure 4:
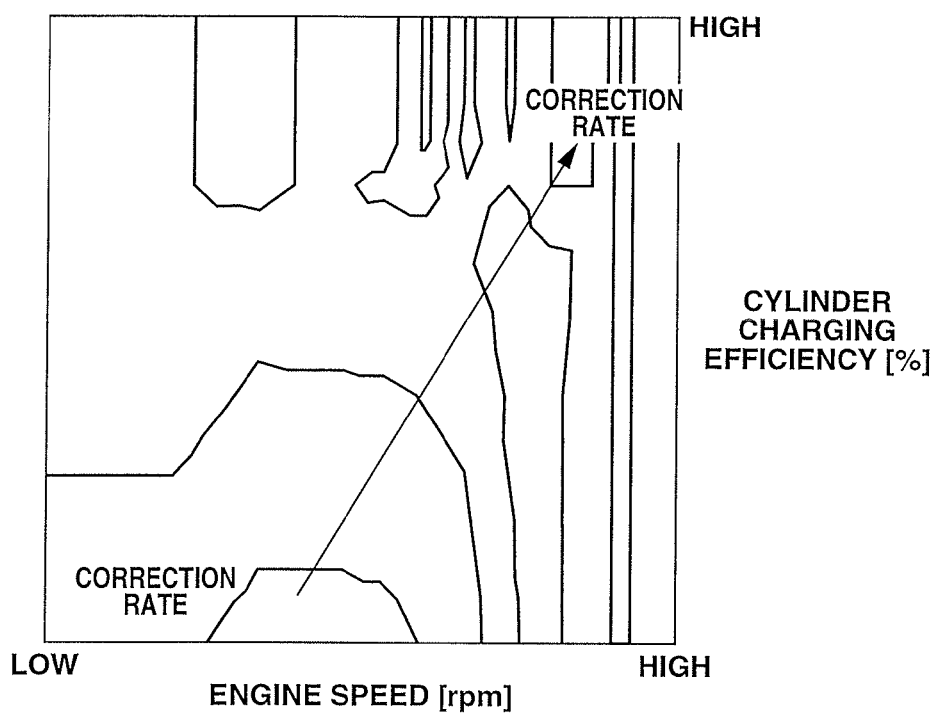
FIG. 4 is a characteristic view showing a map for setting a correction rate for the ignition timing for the trace knock control of FIG. 2.

A block B12 is a section to determine a correction rate or factor of the trace knock ignition timing, from the cylinder charging efficiency and engine speed, by referring to a map of a trace knock ignition timing correction rate preliminarily set and stored, as shown in FIG. 4, through experiment using an actual machine. As the conversion angle of the intake VTC becomes greater on the advance side, the trace knock ignition timing shifts to the retard side, and the amount of the shift has sensitivity to the engine speed and the cylinder charging efficiency. Accordingly, as shown in FIG. 4, the ignition timing correction rate is set higher as the cylinder charging efficiency is higher and as the engine speed is higher.

A block B13 is a section to determine a sensed VTC conversion angle VTCNOW or sensed value of the VTC conversion angle which is the valve timing of the intake VTC, from the signals transmitted from the crank angle sensor 12 and cam angle sensor 11. This sensed VTC conversion angle VTCNOW corresponds to a phase difference of a phase of the cam angle of the cam shaft with respect to the crank angle of the crank shaft from a reference phase.

Figure 5:
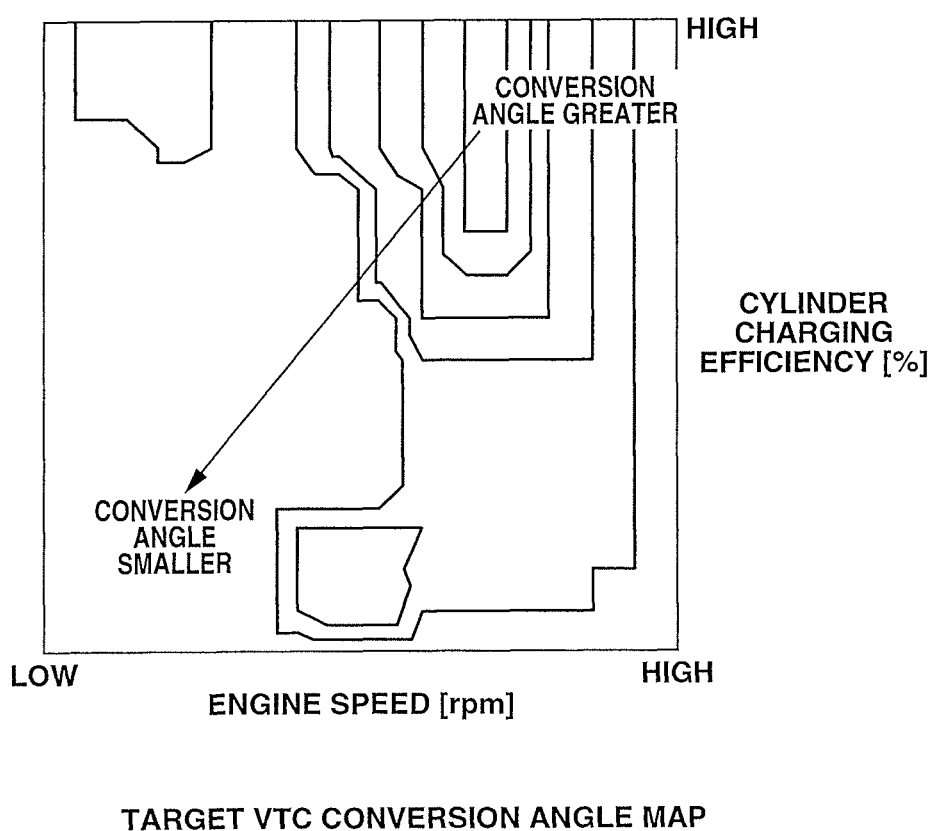
FIG. 5 is characteristic view showing a map for setting a target VTC conversion angle of FIG. 2.

A block B14 is a section to calculate a target VTC conversion angle TARGET or target value of the VTC conversion angle to minimize the fuel consumption, from the cylinder charging efficiency and the engine sped, by referring to a map of the target VTC conversion angle TARGET preliminarily set and stored as shown in FIG. 5, through experiment using an actual machine. As shown in FIG. 5, the target VTC conversion angle TARGET is set greater on the high speed, high load side where the charging efficiency and the engine speed are high, and smaller on the low speed, low load side where the charging efficiency and the engine speed are low.

A block B15 is a section to calculate an estimated VTC conversion angle VTCNFS or an estimated value of the VTC conversion angle, from the sensed VTC conversion angle VTCNOW, the target VTC conversion angle TARGET, other parameter or parameter(s) such as the oil temperature sensed by oil temperature sensor 17. The calculation process of the estimated VTC conversion angle VTCNFS is explained later with reference to FIG. 6.

A block B16 is a section to determine a correction quantity by multiplying the estimated VTC conversion angle VTCNFS determined at block B15 and the correction rate determined at block B12. A block B17 is a section to calculate a final trace knock ignition timing by subtracting the correction quantity determined at block B16, from the base ignition timing determined at block B11.

Figure 6:
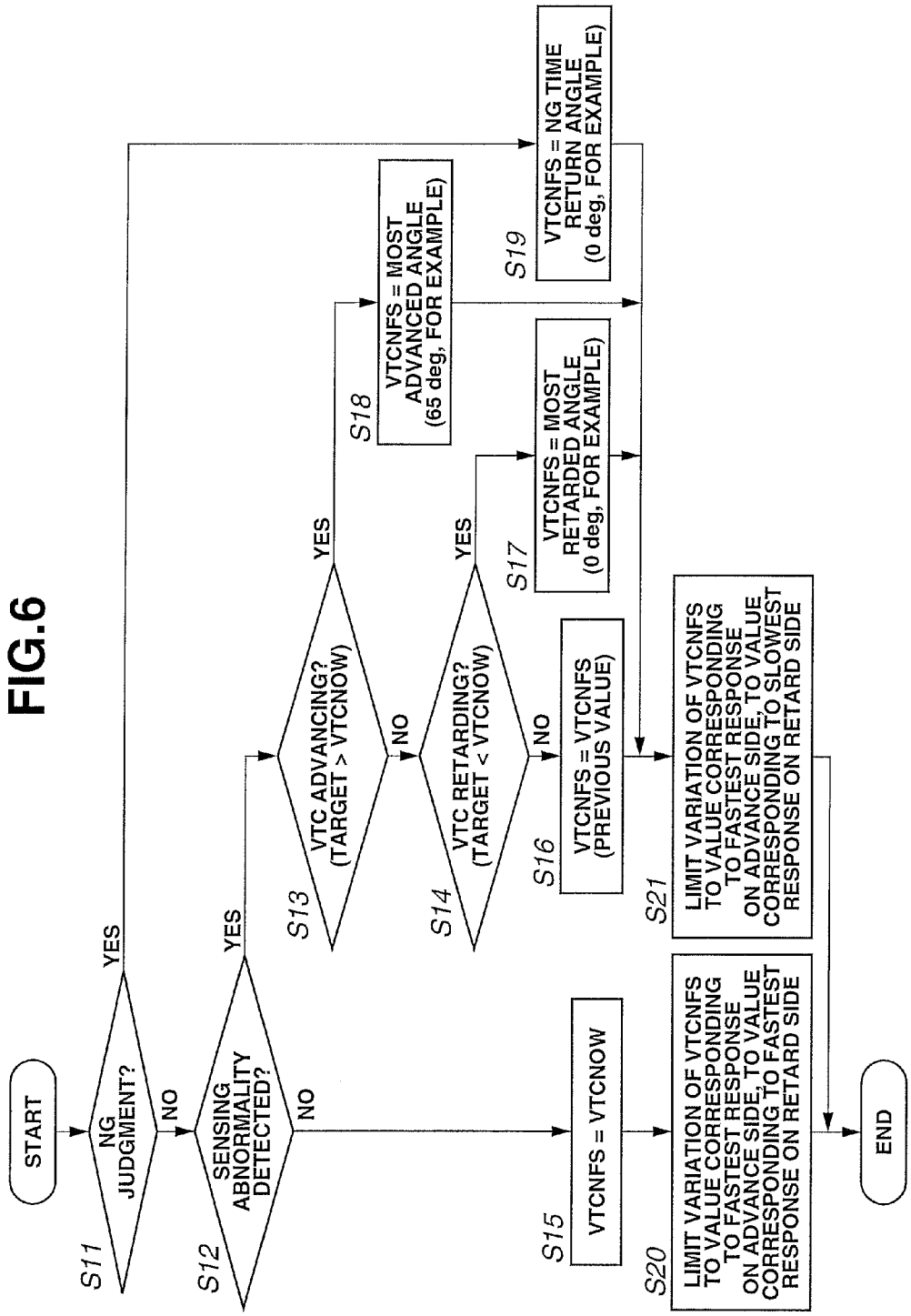
FIG. 6 is a flowchart showing a flow of control of setting estimated (sensed) VTC conversion angle in the practical example.

FIG. 6 is a flowchart showing the flow of the process for calculating the estimated VTC conversion angle VTCNFS at block B14. At a step S11, the control system performs an NG (abnormality) judgment to confirm a sensing abnormality of the crank angle sensor (or the cam angle sensor), in accordance with the sensor signal of crank angle sensor 12 and the sensor signal of cam angle sensor 11. For example, the NG (abnormality) judgment is made when a predetermined time period (a time period of two revolutions of the crankshaft, for example) has elapsed in the state in which the sensor abnormality or sensing abnormality of the crank (cam) angle sensor is detected at a later mentioned step S12.

At step S12, the control system determines whether a sensing abnormality of the angle sensor is detected. For example, by counting the number of pulses of a pulse signal outputted by the crank (cam) angle sensor during a predetermined time period. The control system judges that a sensing abnormality is present when the pulse count or the number of pluses counted during the predetermined time period is outside a normal pulse count range of a normal state, and judges that no sensing abnormality is detected and the state is normal when the pulse count or the number of pluses counted during the predetermined time period is inside the normal pulse count range.

At a step S13, the control system examines whether or not VTC is in the process of advancement or advancing. For example, the control system judges that the advancement is in progress when the target VTC conversion angle TARGET increasing to the advance side is greater than the sensed VTC conversion angle VTCNOW, since VTC is controlled on the advance side by a feedback control etc.

At a step S14, the control system examines whether or not VTC is in the process of retardation or retarding. For example, the control system judges that the retardation is in progress when the target VTC conversion angle TARGET increasing to the advance side is smaller than the sensed VTC conversion angle VTCNOW, since VTC is controlled on the retard side by the feedback control etc.

The above-mentioned "VTC conversion angle" can be calculated by converting a time from a time point of detection of a reference pulse signal preliminarily chosen from the pulse signals produced by the crank angle sensor 12, to a time point of detection of a predetermined pulse signal produced by the cam angle sensor 11, to an angle.

If no abnormality is detected in the crank (cam) angle sensor, the judgments of steps S11 and S12 are both negative, and hence the control system proceeds to a step S15. At step S15, the estimated VTC conversion angle VTCNFS to be used for setting the ignition timing as mentioned before is determined by substituting and setting, the sensed VTC conversion angle VTCNOW, for the estimated VTC conversion angle.

When the sensing abnormality of crank (cam) angle sensor is detected while the NG judgment of the sensing abnormality of the crank (cam) angle sensor is not yet produced and hence the sensing abnormality is not yet confirmed or not yet affirmed conclusively, the control system proceeds from step S12 to a step S13 since there is a possibility of the NG judgment. Then, the control system proceeds from step S13 to a step S18 in the case of judgment that VTC is in the process of advancing. At step S18, the estimated VTC conversion angle VTCNFS is set equal to a most advanced angle (65 degrees, for example). On the other hand, in the case of judgment that VTC is in the process of retarding, the control system proceeds from step S14 to a step S17. At step S17, the estimated VTC conversion angle VTCNFS is set equal to a most retarded angle (0 degrees, for example). When the target VTC conversion angle TARGET is equal to the sensed VTC conversion angle VTCNOW, the control system proceeds to a step S16 since the judgments of steps S13 and S14 are both negative. At step S16, the estimated VTC conversion angle VTCNFS is set equal to a previous value of estimated VTC conversion angle VTCNFS, and thereby the estimated VTC conversion angle VTCNFS is held unchanged.

In the case of the NG judgment of the sensing abnormality of the crank (cam) angle sensor, the control system proceeds from step S11 to a step S19. At step S19, the estimated VTC conversion angle VTCNFS is set equal to a predetermined return angle at the time of the NG judgment (0 degrees, for example) to control VTC to return to a predetermined position.

In this practical example, steps 20 and 21 are designed to limit the estimated VTC conversion angle VTCNFS (sensed value) set at steps S15~S19, to or below a predetermined response or response value. Specifically, in this practical example, the estimated VTC conversion angle VTCNFS (sensed value) is limited to be lower than or equal to a fastest response or fastest response value. These steps S20 and S21 correspond to "sensed value limiting means or section, or sensed valve timing limiting means or section" recited in the claims.

Specifically, when the crank (cam) angle sensor is free from abnormality, the step S20 is reached from step S15, and the estimated VTC conversion angle is limited by step S20. In this case, whether the conversion direction is to the advance side or to the retard side, the estimated VTC conversion angle is limited to or below the fastest response value which is the valve timing obtained when the VTC is operated at a fastest response speed.

The above-mentioned "fastest response value" corresponds to a fastest response valve timing which is the valve timing obtained when VTC is operated with the fastest response speed from the time point of sensing a previous sensed valve timing VTCNOW, in the valve timing conversion direction (to the advance side or the retard side) at the time of conversion of the valve timing to the advance side or the retard side. This fastest response valve timing is calculated by the control unit 10, in accordance with the sensed valve timing VTCNOW of the previous cycle (one calculation cycle before, for example), and the fastest response speed of VTC.

Figure 7:
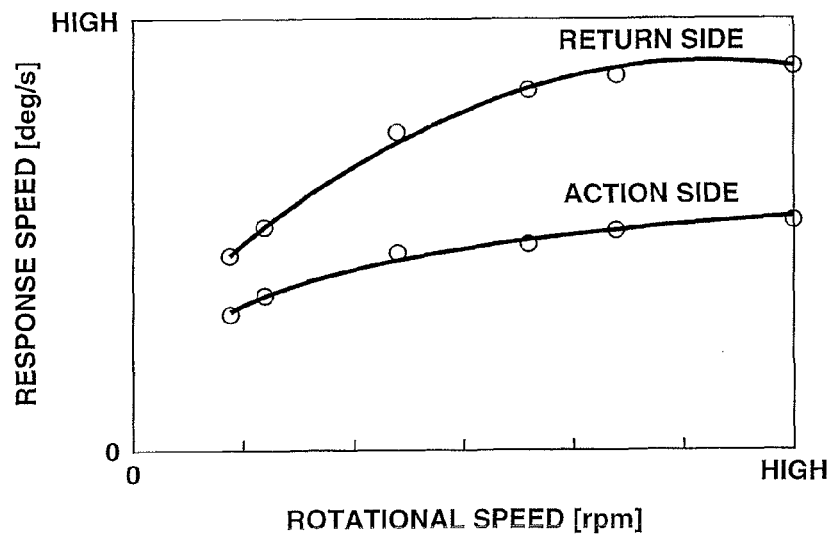
FIG. 7 is a characteristic view showing a table of setting a fastest VTC response speed.

The above-mentioned "fastest response speed" has a sensitivity to the engine speed and the oil temperature. Therefore, the fastest response speed is determined, in accordance the engine speed and the oil temperature, by reference to a map (table) as shown in FIG. 7 prepared and stored by experiment and measurement of the response speed at each engine speed level at the oil temperature to cause the response speed to be fastest. As shown in FIG. 7, the fastest response speed becomes higher as the engine speed becomes higher, both on the advance side (action or actuation side) and the retard side (return side).

Thus, when the sensed VTC conversion angle VTCNOW (the estimated value VTCNFS updated with the sensed value VTCNOW) is equal to a value which cannot be reached even by conversion with the fastest response speed of VTC from the previous sensed value, and hence equal to a value which is actually impossible in view of the response speed of VTC, then the control system considers that the sensed value VTCNOW per se is inaccurate for some reason, and therefore limits the estimated value VTCNFS to a value lower than or equal to a fastest response value obtained by conversion with the fastest response speed. One example of this calculation is as follows:

In the case of shift to the advance side:

$$(VTCNFS \text{ (deg)[after update]} - VTCNFS \text{ [before update]})/\text{calculation period} > \text{fastest response speed (deg/sec) of VTC on the advance side} \quad (1)$$

$$VTCNFS \text{ [after update]} = VTCNFS \text{ [before update]} + \text{fastest response speed on the advance side} \times \text{updating period} \quad (2)$$

When the relationship of the above mathematical expression (1) is satisfied, the control system judges that the variation of the estimated value VTCNFS after update is an inaccurate variation unobtainable even by conversion with the fastest response speed, and therefore, the control system limits the estimated value VTCNFS to the advance side fastest response value expressed by the right side of the equation (2) or to a value lower than this advance side fastest response value. The updating period is equal to 10 ms, for example.

In the case of shift to the retard side:

$$(VTCNFS \text{ [before update](deg)} - VTCNFS \text{ [after update]})/\text{calculation period} > \text{slowest response speed (deg/sec) of VTC on the retard side} \quad (3)$$

$$VTCNFS \text{ [after update]} = VTCNFS \text{ [before update]} - \text{fastest response speed on the retard side} \times \text{updating period} \quad (4)$$

Similarly, on the retard side too, when the relationship of the above mathematical expression (3) is satisfied, the control system judges that the variation of the estimated value VTCNFS after update is an inaccurate variation unobtainable even by conversion with the fastest response speed, and therefore, the control system limits the estimated value VTCNFS to the retard side fastest response value expressed by the right side of the equation (4) or to a value lower than this retard side fastest response value.

When the sensing abnormality of the crank (cam) angle sensor is detected, inclusive of the case of the NG judgment, the control system proceeds to step S21 after setting the sensed value VTCNFS at one of steps S16~S19, and limits the estimated VTC conversion angle VTCNFS. When the conversion direction is to the advance side, the control system limits the estimated VTC conversion angle VTCNFS to or below the fastest response value representing the valve timing reached if VTC is operated at the fastest response speed like step S20. When the conversion direction is to the retard side, on the other hand, the control system limits the estimated VTC conversion angle VTCNFS to the slowest response value.

The above-mentioned "slowest response value" corresponds to a slowest response valve timing which is the valve timing obtained when VTC is operated at the slowest response speed from the time point of sensing a previous sensed valve timing VTCNOW, in the valve timing conversion direction at the time of conversion of the valve timing to the advance side or the retard side. This slowest response value is calculated by the control unit 10, in accordance with the sensed valve timing VTCNOW of the previous cycle (one calculation cycle before, for example), and the slowest response speed of VTC.

Figure 8:
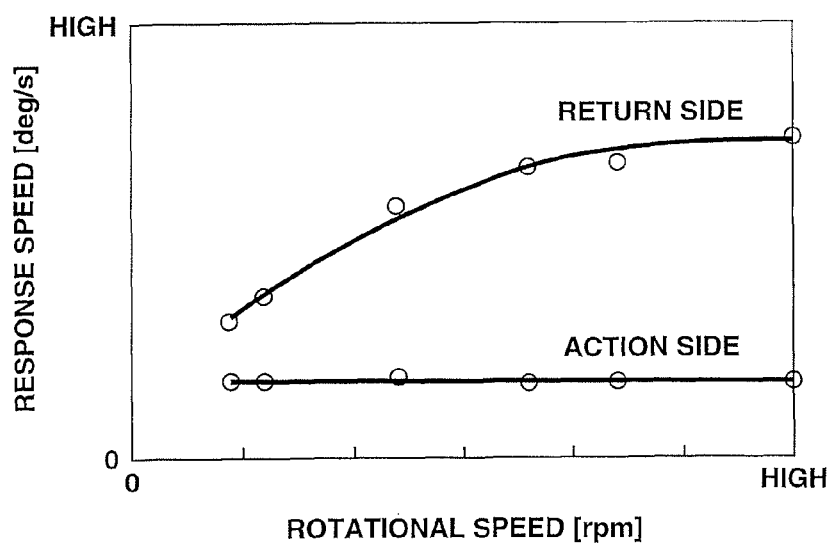
FIG. 8 is a characteristic view showing a table of setting a slowest VTC response speed.

The above-mentioned "slowest response speed" has a sensitivity to the engine speed and the oil temperature. Therefore, the slowest response speed is determined, in accordance the engine speed and the oil temperature, by reference to a map (table) as shown in FIG. 8 prepared and stored by experiment and measurement of the response speed at each engine speed level at the oil temperature to cause the response speed to be slowest. As shown in FIG. 8, the slowest response speed is set lower than the fastest response speed shown in FIG. 7.

One example of calculation at step S21 is as follows: The mathematical expressions are the same as the expressions (1) and (2) in the case of shift to the advance (action side). Therefore explanation is omitted.

In the case of shift to the retard side:

$$(VTCNFS \text{ [before update]}(\deg) - VTCNFS \text{ [after update]})/\text{calculation period} > \text{slowest response speed (deg/sec) of } VTC \text{ on the retard side} \quad (5)$$

$$VTCNFS \text{ [after update]} = VTCNFS \text{ [before update]} - \text{slowest response speed on the retard side} \times \text{updating period} \quad (6)$$

When the relationship of the above mathematical expression (5) is satisfied, the control system limits the estimated value VTCNFS to the retard side slowest response value with the slowest response speed on the retard side.

Following is explanation on operation and effect of this practical example.

Even in the event of abnormality in the crank angle sensor and the cam angle sensor, time is required to detect a sensing abnormality or sensor abnormality definitely. During a time period until the definite or conclusive detection of the sensing abnormality, the sensed VTC conversion angle VTCNOW is inaccurate, and therefore, the setting of the ignition timing might be inaccurate, and knocking might be caused by overly advanced ignition timing if the inaccurate sensed VTC conversion angle VTCNOW is directly used as the estimated or predicted angle VTCNFS used for setting the trace knock control ignition timing.

To meet such a problem, the control system of this practical example is configured to limit the estimated VTC conversion angle VTCNFS at least to or below the fastest response value when the sensed VTC conversion angle VTCNOW is greater than the fastest response value, regardless of whether a sensing abnormality is detected or not. By so doing, the control system can restrain the estimated VTC conversion angle VTCNFS from diverging from the actual value, restrain the ignition timing for the trace knock control from being set excessively to the advance side by the use of the estimated VTC conversion angle VTCNFS, and thereby restrain the occurrence of knocking.

Moreover, since the ignition timing is retarded as the intake VTC is advanced, when the conversion direction is predicted to be the advance direction, the control system limits the estimated value VTCNFS to or below the fastest response value predicted by using the fastest response speed in the advance direction, and sets the trace knock ignition timing by using the thus-determined estimated value VTCNFS. By so doing, the control system can prevent excessive advancement of the ignition timing securely with the trace knock ignition timing deviated to the retard side.

On the other hand, since the ignition timing is advanced as the intake VTC is retarded, when VTC is predicted to be operated in the retard direction, the estimated VTC conversion angle VTCNFS is retarded with respect to the actual VTC conversion angle if the estimated VTC conversion angle VTCNFS is set to the fastest response value as in the case on the advance side. If the trace knock control ignition timing is set on the basis of the estimated VTC conversion angle VTCNFS deviated to the retard side, the ignition timing might be advanced excessively.

Therefore, when VTC is predicted to shift in the retard direction, the control system of this practical example limits the estimated value VTCNFS to the slowest response value of the VTC conversion angle predicted by using the slowest response speed in the retard direction, and sets the trace knock control ignition timing by using the thus-determined estimated value VTCNFS. By so doing, the control system can prevent excessive advancement of the ignition timing securely with the trace knock ignition timing deviated to the retard side, like the case on the advance side.

The present invention is not limited to the illustrated practical example explained above. Various variation and modification are within the purview of the present invention. For example, though the valve timing varying mechanism on the intake valve's side is used in the above-mentioned practical example, the present invention is applicable to an internal combustion engine using a valve timing varying mechanism on the exhaust valve's side.

In the above-mentioned practical example, the control system is configured to calculate the fastest response value of the valve timing obtained by conversion of the previous value of the sensed valve timing with the fastest response speed at the time of conversion of the valve timing to the advance side or the retard side. However, the predetermined response speed is not limited to the fastest response speed and it is optional to calculate a predetermined response value obtained by using a predetermined response speed close to the fastest speed.

EXPLANATION ON REFERENCE NUMERAL

1 . . . internal combustion engine
3 . . . intake valve
4 . . . exhaust valve
6 . . . intake valve timing varying mechanism
9 . . . ignition plug
10 . . . control unit

The invention claimed is:

1. An engine control apparatus for an internal combustion engine provided with a valve timing varying mechanism to vary a valve timing of an intake valve of the internal combustion engine, the engine control apparatus comprising:
   a sensing section to detect a value of a sensed valve timing of the intake valve;
   an ignition timing controlling section to control an ignition timing of the internal combustion engine in accordance with the sensed valve timing;
   a response calculating section to calculate a value of a first response valve timing obtained by conversion from a previous value of the sensed valve timing with a first response speed at a time of conversion to one of an advance side and a retard side of the valve timing; and
   a sensed valve timing limiting section to limit the sensed valve timing to or below a second response valve timing slower than the first response valve timing when the sensed valve timing exceeds the first response valve timing at the time of conversion to the retard side of the valve timing.

2. The engine control apparatus as recited in claim 1, wherein the ignition timing controlling section is a section to control the ignition timing by performing a trace knock control to restrain knocking lower than or equal to a predetermined level, and the ignition timing controlling section is configured to calculate the ignition timing for the trace knock control by using the sensed valve timing.

3. The engine control apparatus as recited in claim 1, wherein the sensed valve timing limiting section is configured to limit the sensed valve timing to the first response valve timing when the sensed valve timing exceeds the first response valve timing and the conversion is to the advance side.

4. The engine control apparatus as recited in claim 1, wherein the first response valve timing is a fastest response valve timing by conversion from a previous value of the sensed valve timing with a fastest response speed, and
   the second response valve timing is a slowest response valve timing by conversion from a previous value of the sensed valve timing with a slowest response speed.

* * * * *